US012729545B2

(12) United States Patent
Janusis et al.

(10) Patent No.: US 12,729,545 B2
(45) Date of Patent: Sep. 8, 2026

(54) SYNTHETIC FLOORING APPARATUS AND METHOD

(71) Applicant: Altro Limited, Letchworth Garden City (GB)

(72) Inventors: Arunas Janusis, Letchworth Garden City (GB); Darren Gray, Letchworth Garden City (GB)

(73) Assignee: Altro Limited, Letchworth Garden City (GB)

( * ) Notice: Subject to any disclaimer, the term of this patent is extended or adjusted under 35 U.S.C. 154(b) by 234 days.

(21) Appl. No.: 18/568,236

(22) PCT Filed: May 31, 2022

(86) PCT No.: PCT/EP2022/064797
§ 371 (c)(1),
(2) Date: Dec. 7, 2023

(87) PCT Pub. No.: WO2022/258442
PCT Pub. Date: Dec. 15, 2022

(65) Prior Publication Data

US 2024/0295129 A1 Sep. 5, 2024

(30) Foreign Application Priority Data

Jun. 10, 2021 (GB) ...................................... 2108301

(51) Int. Cl.
*E04F 15/14* (2006.01)
*B32B 3/06* (2006.01)
(Continued)

(52) U.S. Cl.
CPC .............. *E04F 15/163* (2013.01); *B32B 3/06* (2013.01); *B32B 3/30* (2013.01); *B32B 5/02* (2013.01);
(Continued)

(58) Field of Classification Search
CPC ..... E04F 15/00; E04F 15/163; E04F 2201/07; B29C 65/4815; B29C 66/435;
(Continued)

(56) References Cited

U.S. PATENT DOCUMENTS 3,965,635 A * 6/1976 Renkert .............. B28B 19/0053 264/46.7
5,635,266 A 6/1997 Quinn et al.
(Continued)

FOREIGN PATENT DOCUMENTS

DE 2934133 A1 3/1981
DE 3318914 A1 11/1984
(Continued)

OTHER PUBLICATIONS

International Search Report issued for PCT/EP2022/064797, dated Sep. 21, 2022.
(Continued)

*Primary Examiner* — Chi Q Nguyen
(74) *Attorney, Agent, or Firm* — Westman, Champlin & Koehler, P.A.; Z. Peter Sawicki; Amanda M. Prose

(57) ABSTRACT

A welded synthetic floor-covering material and a method of forming, the floor-covering material formed from one or more adjacent pairs of flooring elements welded together by a symmetrical lower weld which engages each flooring element substantially equally; and wherein the symmetrical lower weld is substantially free from a metallic element; and a method of preparing the welded synthetic floor-covering material having a layout suitable for covering a pre-determined area wherein the welded synthetic floor-covering material includes one or more adjacent pairs of flooring elements welded together with a symmetrical lower weld engaging each flooring element substantially equally.

21 Claims, 8 Drawing Sheets

(51) Int. Cl.

| | |
|---|---|
| ***B32B 3/30*** | (2006.01) |
| ***B32B 5/02*** | (2006.01) |
| ***B32B 5/18*** | (2006.01) |
| ***B32B 27/12*** | (2006.01) |
| ***B32B 27/32*** | (2006.01) |
| ***E04F 15/16*** | (2006.01) |

(52) U.S. Cl.

CPC ................ *B32B 5/18* (2013.01); *B32B 27/12* (2013.01); *B32B 27/32* (2013.01); *B32B 2255/10* (2013.01); *B32B 2266/025* (2013.01); *B32B 2307/412* (2013.01); *B32B 2307/744* (2013.01); *B32B 2471/00* (2013.01); *E04F 2201/07* (2013.01)

(58) Field of Classification Search

CPC ........... B29C 66/1142; B29C 66/73921; B29C 66/71; B29C 65/42; B29C 66/723; B29C 66/0224; B32B 3/30; B32B 3/06; B32B 5/18; B32B 27/32; B32B 5/02; B32B 27/12; B32B 2307/744; B32B 2307/412; B32B 2266/025; B32B 2255/10; B32B 2471/00; B29K 2021/00

See application file for complete search history.

(56) References Cited

U.S. PATENT DOCUMENTS

| | | | | |
|---|---|---|---|---|
| 5,656,126 | A | 8/1997 | Martinez | |
| 5,981,035 | A | 11/1999 | Eshleman | |
| 6,065,261 | A * | 5/2000 | Fehr | B62D 31/02 52/582.1 |
| 6,233,892 | B1 * | 5/2001 | Tylman | E04D 3/366 52/794.1 |
| 6,640,446 | B2 | 11/2003 | Martinez | |
| 6,640,515 | B1 * | 11/2003 | Aota | B23K 20/126 228/2.1 |
| 6,699,554 | B2 | 3/2004 | Sager et al. | |
| 6,862,860 | B2 * | 3/2005 | Aota | B23K 33/004 228/112.1 |
| 6,871,013 | B2 | 3/2005 | Martinez | |
| 7,097,722 | B2 | 8/2006 | McAdoo | |
| 7,678,215 | B2 | 3/2010 | Martin et al. | |
| 7,877,960 | B2 * | 2/2011 | Kennedy | E04C 2/384 52/592.1 |
| 9,004,130 | B2 | 4/2015 | Martinez | |
| 9,481,101 | B2 | 11/2016 | Iimori | |
| 11,665,874 | B2 * | 5/2023 | Deighton | H05K 9/0001 52/270 |
| 11,781,316 | B1 * | 10/2023 | Okeeffe | E04B 5/023 52/126.5 |
| 11,788,314 | B2 * | 10/2023 | Mashal | E04H 9/0237 52/167.1 |
| 2009/0324987 | A1 * | 12/2009 | Copley | B32B 15/20 228/175 |
| 2012/0109596 | A1 | 5/2012 | Gladstone et al. | |
| 2015/0137316 | A1 | 5/2015 | Romanescu | |
| 2016/0122999 | A1 * | 5/2016 | Curtis | B28B 23/0043 52/395 |
| 2018/0345591 | A1 | 12/2018 | Cominsky et al. | |
| 2023/0077373 | A1 * | 3/2023 | Poivet | F24S 25/12 52/173.3 |

FOREIGN PATENT DOCUMENTS

| | | | |
|---|---|---|---|
| DE | 10048000 | A1 | 1/2002 |
| EP | 787572 | B1 | 10/2001 |
| EP | 775460 | B1 | 10/2002 |
| EP | 1325202 | A2 | 7/2003 |
| EP | 1506337 | A2 | 2/2005 |
| EP | 1321251 | B1 | 1/2006 |
| EP | 1422045 | B1 | 6/2006 |
| EP | 2040907 | A1 | 4/2009 |
| EP | 2769831 | B1 | 3/2017 |
| EP | 3431265 | A2 | 1/2019 |
| EP | 2772599 | B1 | 4/2019 |
| EP | 3409446 | B1 | 12/2021 |
| GB | 2578350 | A | 5/2020 |
| JP | 56155721 | A | 12/1981 |
| JP | 2003184291 | A | 7/2003 |
| JP | 2003213916 | A | 7/2003 |
| JP | 2015004219 | A | 1/2015 |
| KR | 20130104436 | A | 9/2013 |
| TR | 201608034 | A2 | 12/2017 |
| WO | 2004/011232 | A1 | 2/2004 |

OTHER PUBLICATIONS

Written Opinion of the International Searching Authority issued for PCT/EP2022/064797, dated Sep. 21, 2022.
Search Report issued for GB2108301.9, dated Jan. 27, 2022.
Combined Search and Examination Report issued for GB2108301.9, dated Jan. 31, 2022.
Search Report issued for GB2108301.9, dated Apr. 7, 2022.
Search Report issued for GB2206006.5, dated May 6, 2022.

* cited by examiner 12G
30
M3,M4
20
16G
14G

SYNTHETIC FLOORING APPARATUS AND METHOD

CROSS-REFERENCE TO RELATED APPLICATION

This Application is a Section 371 National Stage Application of International Application No. PCT/EP2022/064797, filed May 31, 2022 and published as WO2022/258442 on Dec. 15, 2022, in English, which claims priority to GB2108301.9, filed Jun. 10, 2021, the contents of which are hereby incorporated by reference in their entirety.

The present invention relates to a welded floor-covering and to a method of welding a synthetic floor-covering.

Synthetic flooring used to cover a large or complex area typically needs to be formed from different synthetic flooring elements which need to be joined together. The joints are typically created by forming a groove on the upper surface of the adjacent synthetic flooring elements along the juncture where they meet using a groove cutter and then by hot welding the surface, using a 4.5 mm weld rod. A groove is needed as it is difficult to press a melted weld rod into a gap between adjacent synthetic flooring elements as the gap needs to be as small as possible.

It is generally known that cutting a groove having the desired depth is not straightforward because synthetic floor-coverings can be thin and hard. Furthermore, it is necessary for the groove to be formed uniformly along the juncture without being displaced to either side of the gap between the different flooring elements. This may be done by guiding the groove cutter using a ruler but this is a time consuming and expensive solution.

Modifications to the groove cutter have been made to provide it with a guide to align it with the juncture such that the guide slides along the juncture as the groove is cut but there have still been problems due to non-uniform grooves due to twisting of the groove cutter. This is believed to be because the strength of the guide is no match for the force required to form the groove.

Further problems include that the welded groove creates a 4.5 mm wide line across the surface of the flooring which results in the following problems:

disruption of the design of the flooring, formation of a dirt trap, and creation of a weaker area on the surface of the flooring which can be damaged, enabling water to ingress under the flooring.

Welded grooves made by hot welding by different operators may have different appearances as they may have different levels of success at forming grooves depending upon their skill, experience level, strength, and dexterity. As a result, the welded flooring may have an inconsistent appearance.

When providing flooring for the transport sector, different flooring elements having logos, walkway areas and/or wheelchair spaces which need highlighting are welded to the other flooring elements. Provision of these different flooring elements generally leads to the same issues with aesthetics, dirt traps, and weaker areas.

Flooring production facilities also tend to have limitations in the width of flooring that they can produce, e.g. the maximum width may be about 2 m. This means that larger spaces may require a weld running through them which can detract from or disrupt the design of the flooring.

Furthermore, it has been found that the disruption in the design of the flooring can be disconcerting to dementia patients.

A way of ameliorating these problems has been sought.

According to the invention there is provided a welded synthetic floor-covering material which is formed from two or more flooring elements wherein each adjacent pair of flooring elements is welded together by a symmetrical lower weld which engages each flooring element substantially equally; and wherein the symmetrical lower weld is substantially free from a metallic element;

wherein each flooring element comprises one or more upper layers above the symmetrical lower weld wherein the one or more upper layers comprise a decorative layer;

wherein each flooring element has a floor engaging lower surface and wherein each flooring element of an adjacent pair of flooring elements forms a partial groove on its floor-engaging lower surface such that the symmetrical weld is formed in an adjacent pair of partial grooves wherein the adjacent pair of partial grooves is symmetrical.

According to the invention there is also provided a method of preparing a welded synthetic floor-covering material having a layout suitable for covering a pre-determined area wherein the welded synthetic floor-covering material comprises two or more flooring elements which have a floor-engaging lower surface and wherein the method comprises the following steps:

(a) providing a floor plan for the pre-determined area wherein the floor plan defines a layout of flooring elements including positions of one or more welds;
(b) providing a length of flooring and forming a groove on the floor-engaging surface of the flooring at the position of each of the one or more welds;
(c) cutting the length of flooring to form the one or more adjacent pairs of flooring elements; and
(d) arranging the flooring elements according to the layout and welding together each of the one or more adjacent pairs of flooring elements to form a symmetrical lower weld which engages each flooring element substantially equally.

Advantages of the invention include that as the welded synthetic floor-covering has a symmetrical lower weld such that an upper surface of the welded synthetic floor-covering is (substantially) free from welds, the 4.5 mm wide surface weld line is removed such that there is no disruption of the surface finish of the product. As a result, the welded synthetic floor-covering is suitable for use in areas used by dementia patients. As the welds are lower welds such that they are generally provided in one or more lower layers of the flooring elements or floor-covering material, they are less prone to damage such that water ingress is reduced. The welded floor covering material meets the EN standard for water ingression (EN13553:2017). As the upper surface of the welded synthetic floor covering is free from welds, there is no need to use a weld rod having an appearance to match the colour of the rest of the welded floor covering material which further reduces variations in the appearance of its upper surface. Advantages of the use of symmetrical lower weld include that welded junctures between neighbouring flooring elements display consistent quality and strength between various welded samples, removing the variation seen by welding performed by different operators. A further advantage is that the welded synthetic floor-covering may be installed swiftly, reducing the fit out time for a new or renovated building, leading to cost savings. The welded floor-covering material is a precisely shaped product suitable for covering a pre-defined floor substrate. The welded floor-covering material has a consistent strength and resilience. The welded floor-covering material has increased tensile strength. Furthermore, the method according to the invention is suitable for automation which further reduces labour costs.

In some embodiments, step (a) of the method of the invention may additionally comprise preparing a flooring cutting plan for cutting up a length of flooring to obtain the flooring elements. In some embodiments, the flooring cutting plan may minimise waste. In some embodiments, the steps of the method of the invention may be carried out sequentially such that cutting step (c) is performed after groove forming step (b).

In some embodiments, step (b) and/or step (c) of the method of the invention may be performed using a substrate on which the length of flooring is secured. In some embodiments, step (c) of the method of the invention may comprise trimming the length of flooring to remove one or more superfluous areas of flooring.

In some embodiments, step (a) may comprise analysing a surface plan for the predetermined area. In some embodiments, the predetermined area may comprise one or more spaces to be covered by flooring. In some embodiments, step (a) may generate a CAD file for programming an automated tool for performing steps (b) and (c). In some embodiments, the CAD file may specify one or more characteristics for each flooring element in the layout such as its shape, position, orientation, and/or dimensions.

In some embodiments, the symmetrical lower weld may have a semi-circular or semi-oval cross-sectional shape. In some embodiments, each of the two or more flooring elements may have an outer edge which has a rectilinear and/or curved shape such that each of the one or more of the symmetrical lower welds may be rectilinear or curved.

In some embodiments, each partial groove may have a uniform depth and/or uniform width. Advantages of having a uniform depth and/or uniform width include that the weld formed is stronger.

In some embodiments, the one or more upper layers may be separated by a gap. In some embodiments, the gap may be a narrow gap, e.g. such that it is not visible by a person while walking on the welded floor-covering material; for example, a narrow gap may have a width of less than about 1 mm. In some embodiments, the gap may be aligned to the groove, e.g. such that the gap is aligned to the middle of the groove. In some embodiments, the gap may be aligned to the groove by being cut after the groove has been formed.

In some embodiments, step (d) may comprise sealing one or more upper layers of each adjacent pair of flooring elements. In some embodiments, step (d) may be performed on an insulating and/or thermally-reflective substrate (such as Altro Whiterock™). In some embodiments, the one or more upper layers may be sealed such that there is no gap between the one or more upper layers. In some embodiments, the one or more upper layers may form a sealed volume. Advantages of sealing the one or more upper layers include that there is no formation of a dirt trap or of areas of weakness on the upper surface of the floor-covering. As a result of the absence of dirt traps, the welded floor-covering appears cleaner. It has been found that even if a welded and sealed floor-covering material is stressed by bending in the area of the sealed upper layers, the seal is not broken. As a result, the welded and sealed floor-covering material may be manipulated during installation with a reduced risk of damage to the seal and/or weld, e.g. such manipulation may include bending the welded and sealed floor-covering material around corners.

In some embodiments, the symmetrical lower weld has a depth which is from 40% to 80% of the depth of the floor-covering material. Advantages of limiting the depth of the one or more upper layers or extending the depth of the symmetrical lower weld include that the seal of the one or more upper layers may be improved.

In some embodiments, the synthetic welded floor-covering material may be formed from a plastics or rubber material. In some embodiments, the plastics material may comprise, for example, one or more of the following polymers: PVC, polyvinyl butyral (PVB), polylactic acid (PLA), polyester, a polyolefin, a thermoplastic elastomer and/or polyacrylate. In some embodiments, the polyolefin may comprise a homo or copolymer. In some embodiments, the polyolefin may comprise an ethylene homopolymer, a polypropylene homopolymer, an ethylene-propylene copolymer, an ethylene-butene copolymer, an ethylene-hexene copolymer, an ethylene-methylpentene copolymer, an ethylene-octene copolymer, a butene-methylpentene copolymer, an ethylene-vinyl acetate copolymer, an ethylene-methacrylic acid copolymer, and/or an ethylene-methyl methacrylate copolymer.

In some embodiments, the two or more flooring elements of the welded floor-covering material may include one or more of the following layers: one or more base layers, a support layer, a structural layer, a topcoat layer, a clear wear layer, and/or an upper protective coating layer. In some embodiments, the two or more flooring elements of the welded floor-covering material may be a non-slip flooring element which includes a non-slip layer. In some embodiments, the one or more symmetrical lower welds, one or more grooves, and/or one or more partial grooves may be formed in one or more lower layers of the welded floor-covering material and/or of one or more of the flooring elements. In some embodiments, the one or more lower layers may comprise one or more base layers, a support layer, a structural layer, and/or a topcoat layer. In some embodiments, the one or more lower layers do not include and/or are below a decorative layer such that the decorative layer is not damaged by the formation of a groove or partial groove.

In some embodiments, the two or more flooring elements and/or the welded floor-covering material may include one or more base layers. In some embodiments, the one or more base layers may include a base layer which forms a floor-engaging lower surface. In some embodiments, the two or more flooring elements and/or the welded floor-covering material may include one or more of a support layer, a structural layer, a topcoat layer, a clear wear layer, and/or an upper protective coating layer in addition to the one or more base layers. In some embodiments, the one or more base layers may comprise a floor-engaging layer which is an optionally foamed layer of synthetic material, an optionally pre-coated fabric (e.g. fleece or textile) layer, a tissue layer, a scrim (or support) layer, and/or a self-adhesive layer. In some embodiments, the one or more base layers may comprise an upper layer of optionally foamed synthetic material and a lower floor-engaging layer which is an optionally pre-coated fabric (e.g. fleece or textile) layer, a tissue layer, a scrim (or support) layer, and/or a self-adhesive layer.

In some embodiments, the optionally foamed layer of synthetic material may be a foamed layer. In some embodiments, the foamed layer may comprise a foamed plastics material capable of imparting a sound attenuation effect, for example an acoustic impact sound absorption of more than 10 dB. In some embodiments, the acoustic impact sound absorption may be from 4 dB, e.g. from 6 dB, e.g. from 8 dB, 10 dB, e.g. from 12 dB to 22 dB, e.g. to 20 dB, e.g. to 18 dB, e.g. to 16 dB. In some embodiments, the acoustic impact sound absorption may be 12 dB, 14 dB, 16 dB, or 18 dB. In some embodiments, the foamed plastics material may be mechanically foamed by incorporating one or more types of compressible plastic spheres. In some embodiments, the foamed plastics material may be chemically foamed by an exothermic or endothermic blowing agent. In some embodiments, the blowing agent may be an azodicarbonamide, modified azodicarbonamide, oxy-bis(benzene-suldonylhydrazide), 5-phenyltetrazole, p-Toluylensulfonyl-semicarbazid or p-Toluylensulfonyl-hycarbazide; for example, the blowing agent may be Hydrocerol® (Clariant) or Toamazol™ (Bergen International). In some embodiments, the foamed layer may comprise one or more of the following polymers: PVC, polyvinyl butyral (PVB), polylactic acid (PLA), polyolefin, polyester and/or polyacrylate.

In some embodiments, the two or more flooring elements and/or the welded floor-covering material may include a support layer. In some embodiments, the two or more flooring elements and/or the welded floor-covering material may include a support layer in combination with one or more base layers arranged on a lower side of the support layer. In some embodiments, the two or more flooring elements and/or the welded floor-covering material may include a support layer in combination with one or more of the following upper layers: a structural layer, a topcoat layer, a clear wear layer, and/or an upper protective coating layer. In some embodiments, the support layer may be provided as a base layer such that the two or more flooring elements and/or the welded floor-covering material comprise or consist of a support layer and one or more of a structural layer, a topcoat layer, a clear wear layer, and/or an upper protective coating layer. In some embodiments, the support layer may be provided on an upper surface of one or more base layers such that the two or more flooring elements and/or the welded floor-covering material comprise or consist of one or more base layers, a support layer and one or more of a structural layer, a topcoat layer, a clear wear layer, and/or an upper protective coating layer. In some embodiments, the support layer may be a film or an optionally woven layer. In some embodiments, the support layer may be formed from fibreglass. In some embodiments, the support layer may be a scrim complex. In some embodiments, the support layer may have an impregnated layer of plastics material.

In some embodiments, the two or more flooring elements and/or the welded floor-covering material may include a decorative layer provided on an upper surface of one or more base layers or of the support layer (if present). In some embodiments, the two or more flooring elements and/or the welded floor-covering material may include a decorative layer in combination with one or more of the following layers: one or more base layers, a support layer, a structural layer, a topcoat layer, a clear wear layer, and/or an upper protective coating layer. In some embodiments, the decorative layer may comprise a printing layer and a printed design layer. In some embodiments, the two or more flooring elements and/or the welded floor-covering material may include a clear wear layer and optionally an upper protective coating layer on an upper surface of one or more base layers, of the support layer, or of the decorative layer. In some embodiments, the decorative layer may be provided on an upper surface of one or more base layers or of a support layer such that the two or more flooring elements and/or the welded floor-covering material comprise one or more base layers and/or a support layer in addition to the decorative layer.

In some embodiments, the printing layer may be suitable for receiving a printed design or having a printed design applied to it by a digital or gravure printer. In some embodiments, the printing layer may have a pigment which is suitable for providing a background to a printed design where such a pigment may have a similar or contrasting colour to one or more colours in the printed design, e.g. a white pigment. In some embodiments, the printing layer may be formed from a plastics material which may comprise, for example, one or more of the following polymers: PVC, polyvinyl butyral (PVB), polylactic acid (PLA), polyester, a polyolefin, a thermoplastic elastomer and/or polyacrylate.

In some embodiments, the printed design layer may comprise a decoration applied by a printing process, for example offset lithography, flexography, digital printing, gravure, or screen printing. In some embodiments, the printed design layer may be a digitally printed design layer. In some embodiments, the printed design layer may comprise a latex-based ink.

In some embodiments, the decorative layer may be a layer having a decoration such as a pattern. In some embodiments, a decoration or pattern may comprise one or more decorative elements such as a decorative or coloured chip or particle which may be formed from an optionally coloured polymeric or inorganic material.

In some embodiments, the two or more flooring elements and/or the welded floor-covering material may comprise a printing layer for receiving a printed decorative layer, a printed decorative layer, and a clear wear layer for protecting the decorative layer wherein the printing layer is applied to one or more base layers or to a support layer.

In some embodiments, the two or more flooring elements and/or the welded floor-covering material may include a topcoat layer. A topcoat layer may be used as an alternative to a decorative layer. In some embodiments, the two or more flooring elements of the welded floor-covering material may include a topcoat layer in combination with one or more of the following layers: one or more base layers, a support layer, a structural layer, a decorative layer, a clear wear layer, and/or an external protective coating layer. In some embodiments, the topcoat layer may be pigmented. Benefits of including a pigmented topcoat layer include that where a flooring element includes a support layer, the pigmented topcoat layer prevents the support layer from being seen. In some embodiments, the topcoat layer may include one or more decorative elements. In some embodiments, the topcoat layer may be provided on an upper surface of one or more base layers or of a support layer such that the two or more flooring elements and/or the welded floor-covering material comprise one or more base layers and/or a support layer in addition to the topcoat layer.

In some embodiments, the one or more decorative elements may be formed from glass, a ceramic material, an inorganic material (such as aluminium oxide or silicon carbide), and/or a plastics material (such as PVC, polyvinyl butyral (PVB), polylactic acid (PLA), polyester, a polyolefin, a thermoplastic elastomer and/or polyacrylate). In some embodiments, each of the one or more decorative elements may be in the form of a chip having a visible flat surface, a bead or a sphere. In some embodiments, a decorative element may be a decorative polymeric particle. In some embodiments, a decorative polymeric particle may be a soft degradable decorative polymeric particle having a hardness which is the same as or less than the hardness of the decorative layer and/or topcoat layer (e.g. a particle formed from polyhydroxyalkanoate (e.g. PHA and/or PHB) and/or an acrylic copolymer). Advantages of using soft degradable decorative polymeric particle in the decorative and/or topcoat layer include that when flooring is cut to form flooring elements for use in the invention, the soft degradable decorative polymeric particles will also be cut which gives a smooth edge to the juncture which is more suitable for sealing.

In some embodiments, the two or more flooring elements and/or the welded floor-covering material may include a clear wear layer. In some embodiments, the two or more flooring elements of the welded floor-covering material may include a clear wear layer in combination with one or more of the following layers: one or more base layers, a support layer, a structural layer, a decorative layer, a topcoat layer, and/or an external protective coating layer. In some embodiments, the wear layer may comprise a clear plastics material including one or more of the following polymers: PVC, polyvinyl butyral (PVB), polylactic acid (PLA), polyester, a polyolefin, a thermoplastic elastomer and/or polyacrylate. In some embodiments, the two or more flooring elements of the welded floor-covering material may include a decorative layer with a clear wear layer on top of the decorative layer such that the clear wear layer protects the decorative layer and allows it to be seen. In some embodiments, where the welded floor-covering material is an embossed non-slip welded floor-covering material comprising a decorative layer, the clear wear layer may comprise two clear wear layers to reduce the risk of the non-slip particles damaging the decorative layer when the welded floor-covering material is embossed.

In some embodiments, the non-slip layer may comprise one or more particles suitable for providing a non-slip surface. In some embodiments, the non-slip layer may be provided as part of the wear layer. In some embodiments, the particles of the non-slip layer may be at least partially embedded in the wear layer or in the topcoat layer. In some embodiments, where the two or more flooring elements and/or the welded floor-covering includes a non-slip layer, the clear wear layer may comprise two clear wear layers which comprise at least one upper wear layer of a transparent synthetic material comprising one or more embedded non-slip particles and at least one lower wear layer of a transparent synthetic material which contains at least part of the one or more non-slip particles. Advantages of having two or more wear layers include that if the floor-covering material is embossed, the appearance of a printed decorative layer is not damaged by the one or more embedded non-slip particles. In some embodiments, a flooring element may have a protective coating layer on an upper surface of the wear layer.

In some embodiments, the two or more flooring elements and/or the welded floor-covering material may include a protective coating layer. In some embodiments, the two or more flooring elements of the welded floor-covering material may include a protective coating layer in combination with one or more of the following layers: a foamed layer, a support layer, a structural layer, a topcoat layer, a decorative layer, and/or a clear wear layer. In some embodiments, the protective coating layer may comprise a cured polymer layer which seals an upper surface of a flooring element. In some embodiments, the protective coating layer includes a polyurethane, polyacrylate, urethane acrylate or a PVDF based composition. In some embodiments, the protective coating layer may be applied as a film.

In some embodiments, the two or more flooring elements and/or the welded floor-covering material may be embossed to provide a decorative finish and/or to improve the non-slip properties of the flooring element.

In some embodiments, the non-slip layer comprises one or more particles suitable for providing a non-slip surface. In some embodiments, the particles may be at least partially embedded in the flooring element. In some embodiments, the particles may comprise one or more aggregate materials. In some embodiments, the particles may comprise one or more types of slip resistant particles such as a glass particle (e.g. a recycled glass bead), a silica particle, a silicon carbide particle, a polymeric particle (for example Nylon (Trademark)), a ceramic particle (e.g. porcelain) and/or an aluminium oxide particle. In some embodiments, the polymeric particle may be a hard degradable polymeric particle which has a hardness which is greater than the hardness of an upper layer of the flooring element (e.g. a particle formed from polyester (for example polylactic acid and/or polyglycolic acid, a terephthalate copolymer (such as polyethylene terephthalate and/or polybutylene terephthalate), polycarbonate or polycarbonate copolymer) and/or nylon). In some embodiments, the particles may be smooth particles. A smooth particle is a particle which has no angular protrusion or indentation, for example a particle which has no protrusion or indentation having an outward facing angle of about 90° or less. In some embodiments, the particles may be one or more of a smooth sphere, bead, and/or grain. The advantage of using a smooth particle in the welded floor-covering material according to the invention is that the cured coating is easier to clean as the coating lacks any angular surface in which a cleaning material (for example the fibres of a mop) may be caught.

It is not straightforward to quantify the difference in hardness between the one or more degradable polymeric particles and the layer of synthetic material because different measurement scales can be used for thermoplastic polymers. Typically, the Shore D hardness scale is used for relatively soft thermoplastic polymers and the Rockwell M hardness scale is used for relatively hard thermoplastic polymers. In some embodiments, the hard polymeric degradable particles may have a hardness which is only quantifiable on the Rockwell M hardness scale and the synthetic material may have a hardness which is only quantifiable on the Shore D hardness scale. In some embodiments, where the hard degradable polymeric particles have a hardness which is quantifiable on the Shore D hardness scale, the hard polymeric degradable particles may have a hardness which is from 2-10 Shore D at 23° C. harder than the Shore D at 23° C. hardness value for the layer of synthetic material, for example about 5 Shore D at 23° C. greater than the Shore D at 23° C. hardness value for the layer of synthetic material. Shore D Hardness is a standardized test consisting in measuring the depth of penetration of a specific indenter. Test methods used to measure Shore D Hardness are ASTM D2240 and ISO 868. The hardness value is determined by the penetration of a Durometer indenter foot into a sample. Shore Hardness measures are dimensionless and may vary from 0 and 100 where a higher number represents a harder material. In some embodiments, the hardness of the hard degradable polymeric particles and of the layer of synthetic material are measured according to ASTM D2240 type D scale at 23° C. (+/−2° C.) and at 50% relative humidity (+/−5%). In some embodiments, the hardness of the hard degradable polymeric particles is measured on the Rockwell hardness M-scale according to ISO2039-2. Advantages of including one or more hard degradable polymeric particles in an upper layer of the floor-covering covering material or is exposed as an upper layer of the floor-covering covering material during use include that the hard degradable polymeric particles are fully embedded in the wear layer and do not affect the maintenance of the product. Only in situations where high product wear is experienced will these particles be exposed through wearing of the layer of synthetic material. Furthermore, the difference in wear resistance between the hard degradable polymeric particles and the wear layer will cause the hard degradable polymeric particles to become exposed, creating surface roughness which produces slip resistance.

In some embodiments, the degradable polymeric particles may be decomposable without burning or combustion to avoid risk of air pollution. In some embodiments, the degradable polymeric particles may be biodegradable (for example by micro-organisms such as bacteria and/or fungi), oxidatively degradable, UV-degradable, and/or thermally degradable. In some embodiments, a biodegradable polymeric particle may be biodegradable in a bioreactor landfill (as determined by ASTM D5511-12 standard test method), an accelerated landfill (as determined by ASTM D5526-12 standard test method), controlled composting conditions (as determined by ASTM D5338-98e1 standard test method), and/or aerobic composting conditions (as determined by ASTM D6400-12 and/or EN13432 (09-2000)). It should be understood herein that a biodegradable polymeric particle that satisfies ASTM D5511-12 is suitable for anaerobic biodegradation under high-solids anaerobic-digestion conditions; a biodegradable polymeric particle that satisfies ASTM D5526-12 is suitable for anaerobic biodegradation under an accelerated landfill environment where leachate is recirculated back into the landfill; a biodegradable polymeric particle that satisfies ASTM D5338-98e1 is suitable for aerobic biodegradation in an aerobic environment at 60° C.; a biodegradable polymeric particle that satisfies ASTM D6400-12 is suitable for aerobic composting in municipal or industrial facilities within 180 days at a temperature between 55.5° C. and 57° C.

According to the invention there is further provided a second welded synthetic floor-covering material which is formed from two or more flooring elements wherein each adjacent pair of flooring elements is welded together by a lower weld wherein the lower weld is substantially free from a metallic element; wherein the floor-covering material comprises one or more upper layers above the weld; and wherein the one or more upper layers are sealed.

Advantages of the second welded synthetic floor-covering material include that by sealing the one or more upper layers, there is no gap between each adjacent pair of flooring elements such that the problem for dementia patients is overcome and the tensile strength of the floor-covering material is improved.

The invention will now be illustrated with reference to the following Figures of the accompanying drawings which are not intended to limit the scope of the claimed invention:

FIG. 3B shows flooring prepared in the fourth step of the method according to the invention;

FIG. 4B shows flooring prepared in the fifth step of the method according to the invention;

FIG. 7 shows a schematic cross-section of a second embodiment of a reverse-welded surface-covering material according to the invention;

FIG. 8 shows a schematic cross-section of a third embodiment of a reverse-welded surface-covering material according to the invention.

Figure 1:
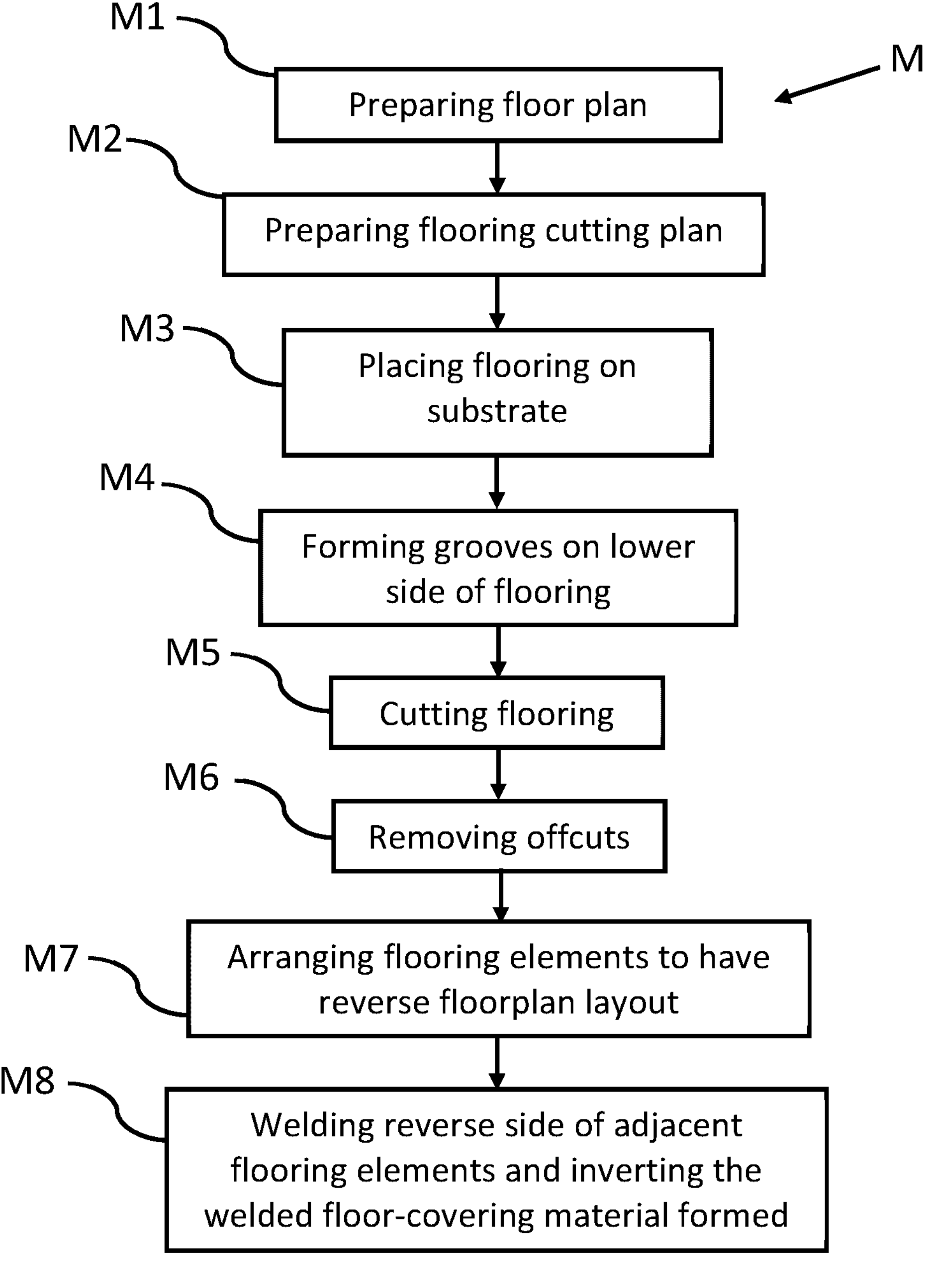
FIG. 1 shows a flowchart which sets out the steps of the method according to the invention.
Figure 2:
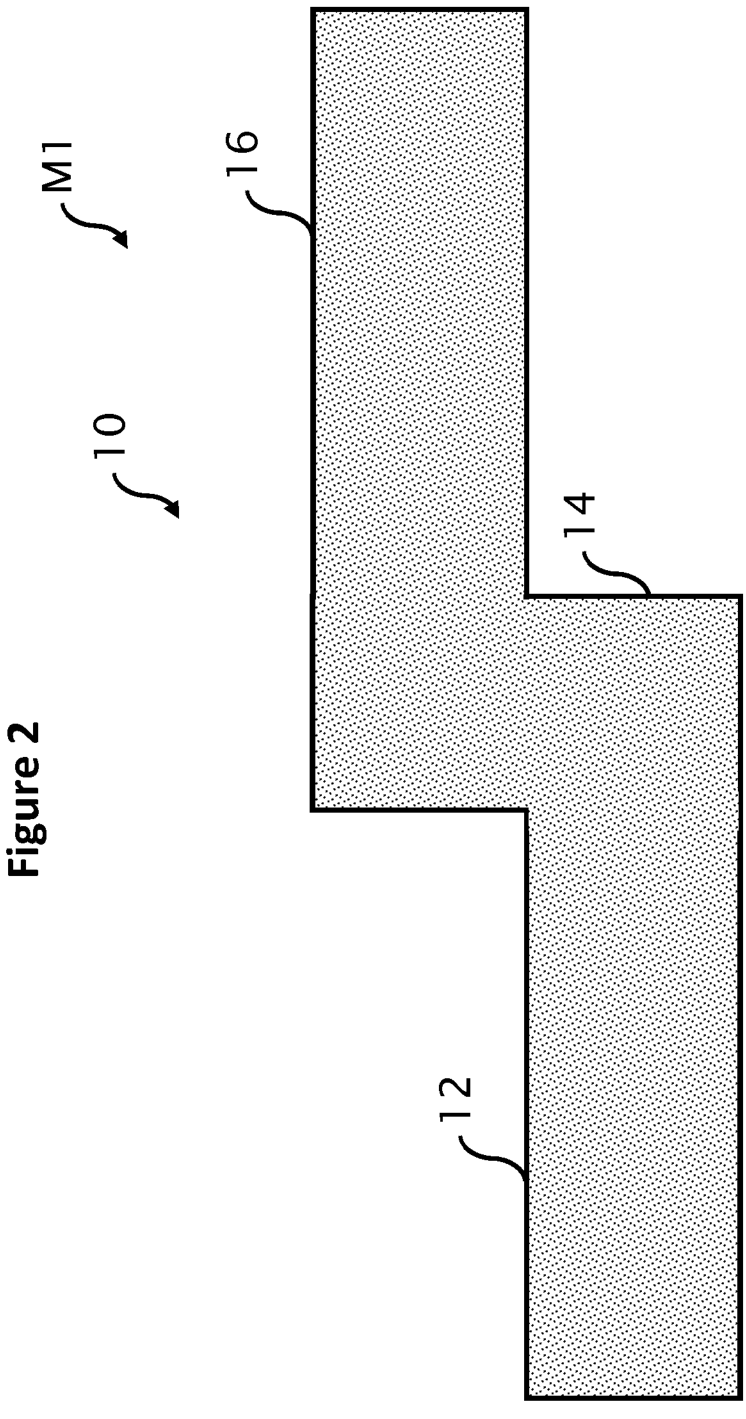
FIG. 2 illustrates a first step of the method according to the invention where a floorplan is prepared for a selected area.

A flowchart setting out the steps of the method according to the invention is indicated generally at M on FIG. 1. Method M is for preparing a welded floor-covering material 10F1, 10F2, 10F3, 10F4, 10F5 which is formed from one or more pairs of flooring elements 12F, 14F, 16F and which is suitable for covering a predetermined area. Method M comprises seven steps M1, M2, M3, M4, M5, M6, M7 which are a first step M1 of preparing a floor plan 10 with a layout of flooring elements 12F, 14F, 16F for covering the predetermined area where the floor plan 10 identifies the position (s) of lower welds 14W, 16W for joining the flooring elements 12F, 14F, 16F together, a second step M2 of preparing a flooring cutting plan for cutting up flooring 30 to obtain the flooring elements 12F, 14F, 16F while minimising waste, a third step M3 of providing flooring 30 on a substrate 20, a fourth step M4 of forming grooves 12G, 14G, 16G on the lower side of flooring 30 in the position(s) identified in step M1, a fifth step M5 of cutting 34, 36 the flooring 30 according to the flooring cutting plan prepared in step M2, a sixth step M6 of removing any offcuts or wastage, a seventh step M7 of arranging the flooring elements 12F, 14F, 16F upside down according to the floor plan layout 10, and an eighth step M8 of welding the reverse side of each adjacent pair of flooring elements 12F, 14F, 16F in the layout to form the welded floor-covering material F1, F2, F3, F4, F5.

In particular, the first step M1 of the method of the invention is illustrated in FIG. 1 and may comprise analysing a surface plan for the predetermined area which may comprise one or more spaces 12, 14, 16 to be covered by flooring 30 to generate the layout 10 of flooring elements 12F, 14F, 16F for covering the predetermined area. For example, step M1 may comprise using a method of analysis as disclosed in GB2578350 (the contents of which are incorporated herein by reference, particularly the methods comprising the steps of any one of FIGS. 2 to 6). Step M1 generates a CAD file which specifies the shape, position, orientation, and dimensions of each flooring element 12F, 14F, 16F in the layout 10 as well as the position of each groove 12G, 14G, 16G and joint or lower weld 14W, 16W between each adjacent pair of flooring elements 12F, 14F, 16F in the layout. The CAD file may be used to program the multi axis cutting tool used in steps M4 and M5.

The second step M2 of the method of the invention comprises analysing the layout of flooring elements 12F, 14F, 16F to determine the most efficient way to cut up flooring 30 while minimising waste, e.g. using a method as described in GB2578350.

Figures 3A, 4A:
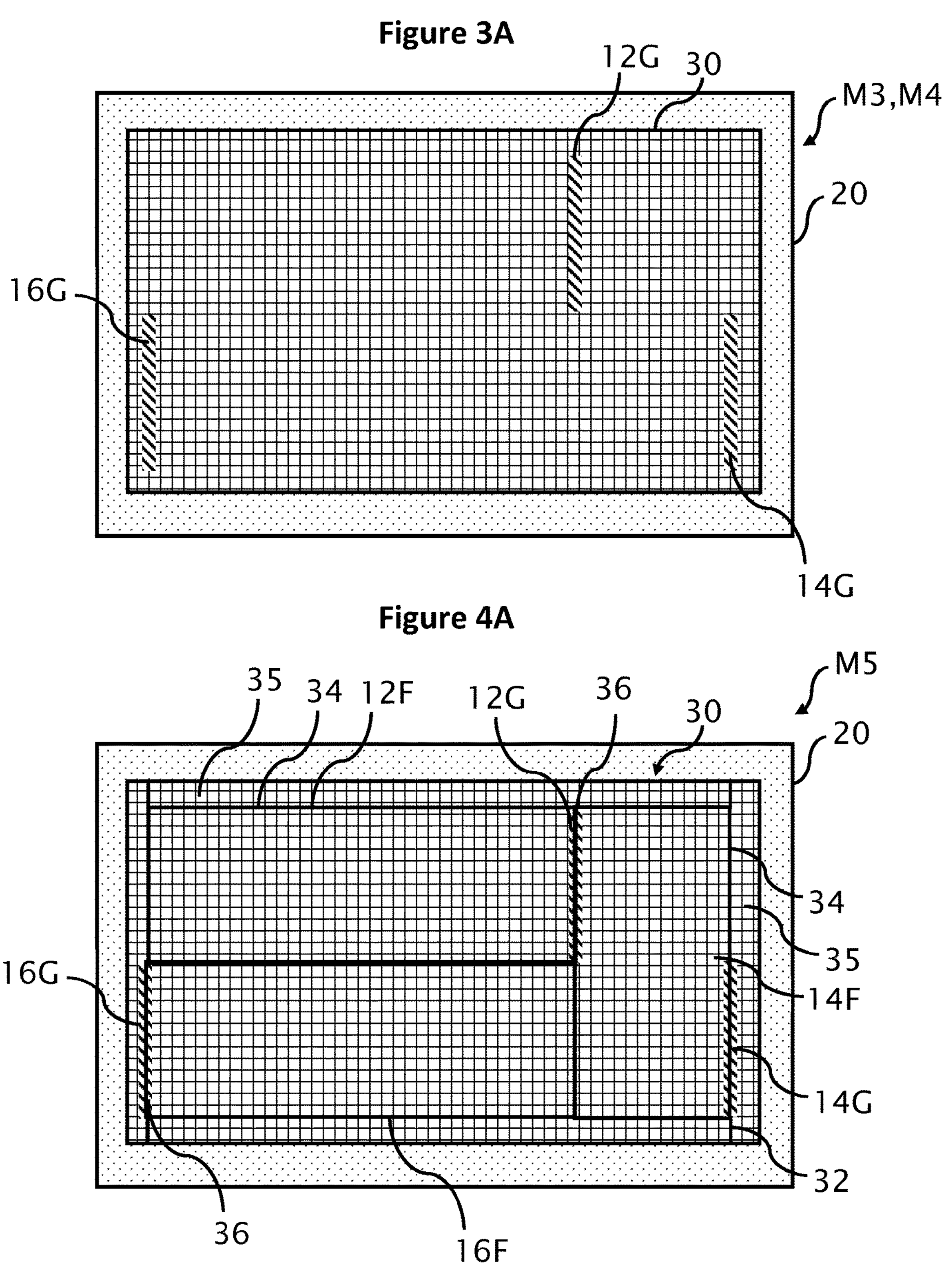
FIG. 3A illustrates third and fourth steps of the method according to the invention where flooring is provided on a substrate and where grooves are formed on a lower surface of the flooring.
FIG. 4A illustrates a fifth step of the method according to the invention where the grooved flooring is cut.
Figures 3B, 4B:
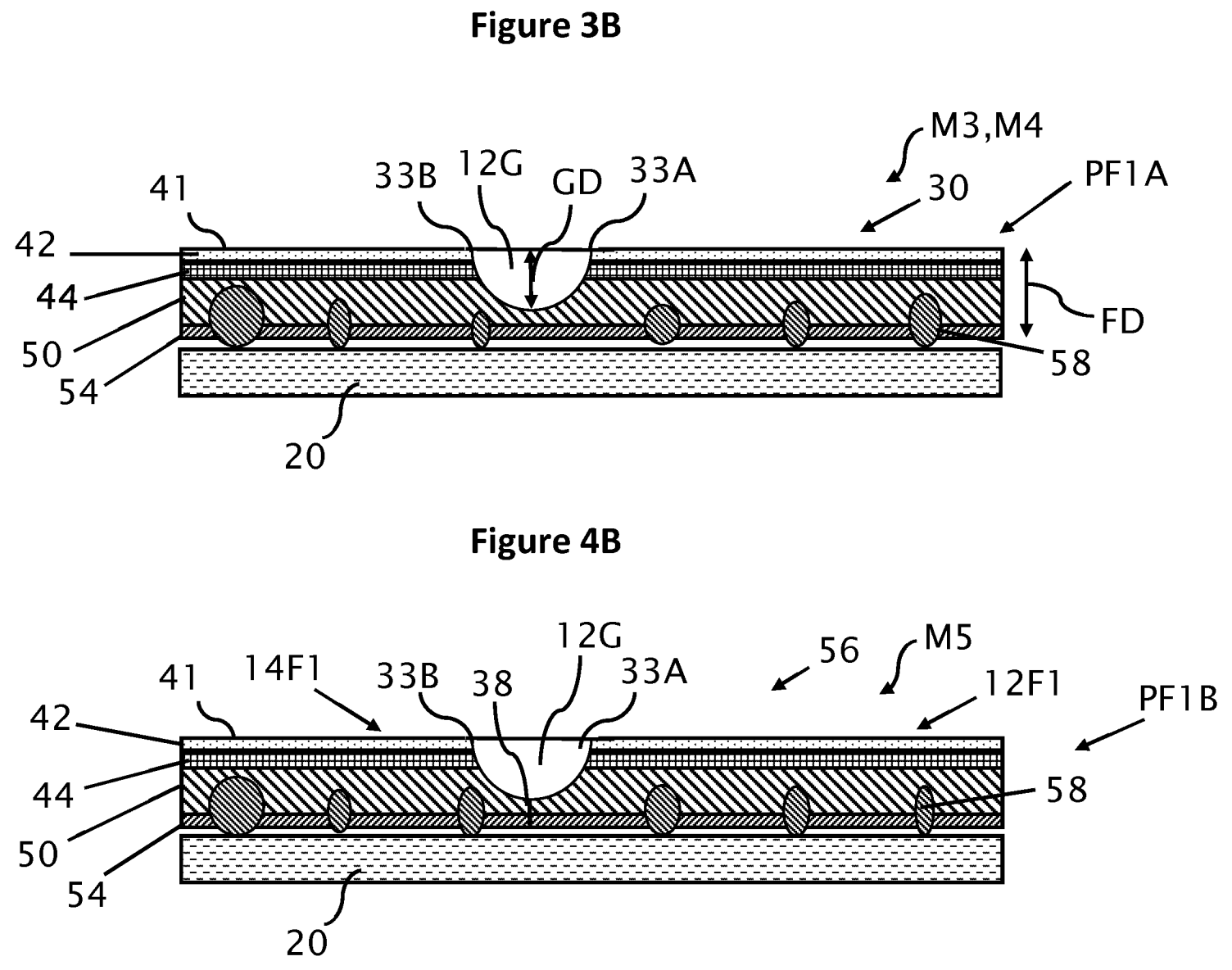

The third step M3 of the method of the invention is illustrated in FIGS. 3A and 3B and comprises providing flooring 30 on a substrate 20 where the flooring 30 is inverted such that its floor-engaging surface is uppermost. Substrate 20 is insulating and has a thermally-reflective surface (e.g. Altro Whiterock™) to minimise loss of thermal energy from the flooring 30 during welding step M8. The advantages of minimising the loss of thermal energy from the flooring 30 during welding step M8 include that the strength of the lower weld 14W, 16W is improved and that the gap 38 in one or more of the upper layers of the welded floor-covering material 10F1, 10F2, 10F3, 10F4, 10F5 may seal, forming a sealed volume 39 and welded and sealed floor-covering material 10F1, 10F2, 10F3, 10F4, 10F5. This is believed to be due to the thermal energy in welding step M8 causing the upper layers of each adjacent pair of flooring elements 12F, 14F, 16F to soften such that the upper layers bind together. The advantage of the welded floor-covering material 10F1, 10F2, 10F3, 10F4, 10F5 having a sealed volume 39 include that dirt traps are not formed on an upper surface 70 of the flooring 30. In an alternative embodiment, a first substrate 20A may be used in steps M4 and M5 which is not insulating and/or lacks a thermally-reflective surface and a second substrate 20B may be used in step M8 which is insulating and has a thermally-reflective surface. In a further alternative embodiment where sealing of the upper layers is not required, a substrate 20 may be used in steps M4, M5, and M8 which is not insulating and/or lacks a thermally-reflective surface.

The fourth step M4 of the method of the invention is illustrated in FIGS. 3A and 3B and comprises calculating a suitable groove depth (GD) and forming grooves 12G, 14G, 16G in the flooring 30 at locations identified in the first step M1 where welds or joints 14W, 16W are needed between each adjacent pair of flooring elements 12F, 14F, 16F in the layout 10. The grooves 12G, 14G, 16G have a groove depth GD which may depend on factors such as the type of flooring, the materials from which the flooring 30 is made, and the thickness of the flooring 30. In particular, the groove depth GD may be selected such that the thickness of the remaining one or more upper layers of the flooring 30 is sufficiently thin for the flooring 30 to be re-sealed during the welding step M8 whilst still thick enough to provide some structural integrity. The thickness of the remaining one or more upper layers of the flooring 30 is the difference between the flooring depth FD and the groove depth GD. The grooves 12G, 14G, 16G may be formed using a multi-axis digital cutting machine having a router tool having a suitable shape for the desired grooves 12G, 14G, 16G, e.g. a semi-circular shape or a semi-oval shape.

A first preparatory flooring prepared in the third and fourth steps M3, M4 of the method M of the invention is indicated generally at PF1A on FIG. 3B. Preparatory flooring PF1A is shown inverted on substrate 20 such the floor engaging surface 41 of the preparatory flooring PF1A is uppermost such that a groove 12G is formed in that surface 41. Preparatory flooring PF1A comprises a layer of synthetic material 42 having a floor-engaging lower surface 41, a support layer 44 in the form of a scrim complex arranged on a surface of the layer 42, a pigmented layer 150 on a surface of the support layer 44, a polyacrylate transparent protective coating layer 54 on a surface of the pigmented layer 50, and a non-slip layer 56 applied to a surface of the protective coating layer 54. The plastics material may be a plasticised PVC plastics material. Groove 12G comprises partial grooves 33A, 33B which are formed in the layer of synthetic material 42, the support layer 44, and the pigmented layer 50. Groove 12G has a depth GD which is about 60% of the thickness of the flooring FD. In an alternative embodiment, the plastics material used to form layers 142, 510, 52 may be a polyolefin material.

The fifth step M5 of the method of the invention is illustrated in FIGS. 4A and 4B and comprises cutting the flooring 30 to create the flooring elements 12F, 14F, 16F for forming the layout 10. The flooring 30 is cut using a slitting wheel mounted on the multi-axis digital cutting machine. The multi-axis digital cutting machine makes trimming incisions 34 to remove superfluous parts of the flooring 30 and shaping incisions 36 to form the flooring elements 12F, 14F, 16F. The flooring 30 is cut such that each groove 12G, 14G, 16G is cut in a predetermined manner, e.g. parallel to the length of the groove such that the grooves 12G, 14G, 16G are cut in half. Cutting step M5 may additionally include an initial verification check that the grooves 12G, 14G, 16G formed in step M4 are in the correct locations such that shaping incisions 36 will cut the grooves 12G, 14G, 16G in half. In this way, flooring elements 12F, 14F, 16F are formed which are defined by an outer edge which comprises one or more trimmed edges 34 and one or more shaped edges 36. In an alternative embodiment, the flooring 30 may not be trimmed such that one or more outer edge of the flooring elements 12F, 14F, 16F may be defined by the periphery of flooring 30. The trimmed edges 34 and shaped edges 36 are shown in FIG. 4A to have a rectilinear shape. In an alternative embodiment, one or more of the trimmed edges 34 and/or shaped edges 36 may have a curved shape.

A second preparatory flooring prepared in the fifth step M5 of the method M of the invention is indicated generally at PF1B on FIG. 4B. Preparatory flooring PF1B is shown inverted on substrate 20 such the floor engaging surface 41 of the preparatory flooring PF1B is uppermost. Like features of second preparatory flooring PF1B to the first preparatory flooring PF1A have been identified by like reference numerals. The second preparatory flooring PF1B is formed from the same layers 42, 44, 50, 54, 56 as the first preparatory flooring PF1A. Second preparatory flooring PF1B has been cut by shaping incision 36 along the middle of groove 12G such that it is separated into a pair of flooring elements 12F1, 14F1 by vertical gap 38 formed by the incision 36. Gap 38 uniformly dissects groove 12G such that two identical partial grooves 33A, 33B are respectively formed on each of the adjacent pair of flooring elements 12F1, 14F1. Gap 38 is formed in the remaining thickness of the upper layers which comprise pigmented layer 50 and transparent protective coating layer 54.

Figure 5:
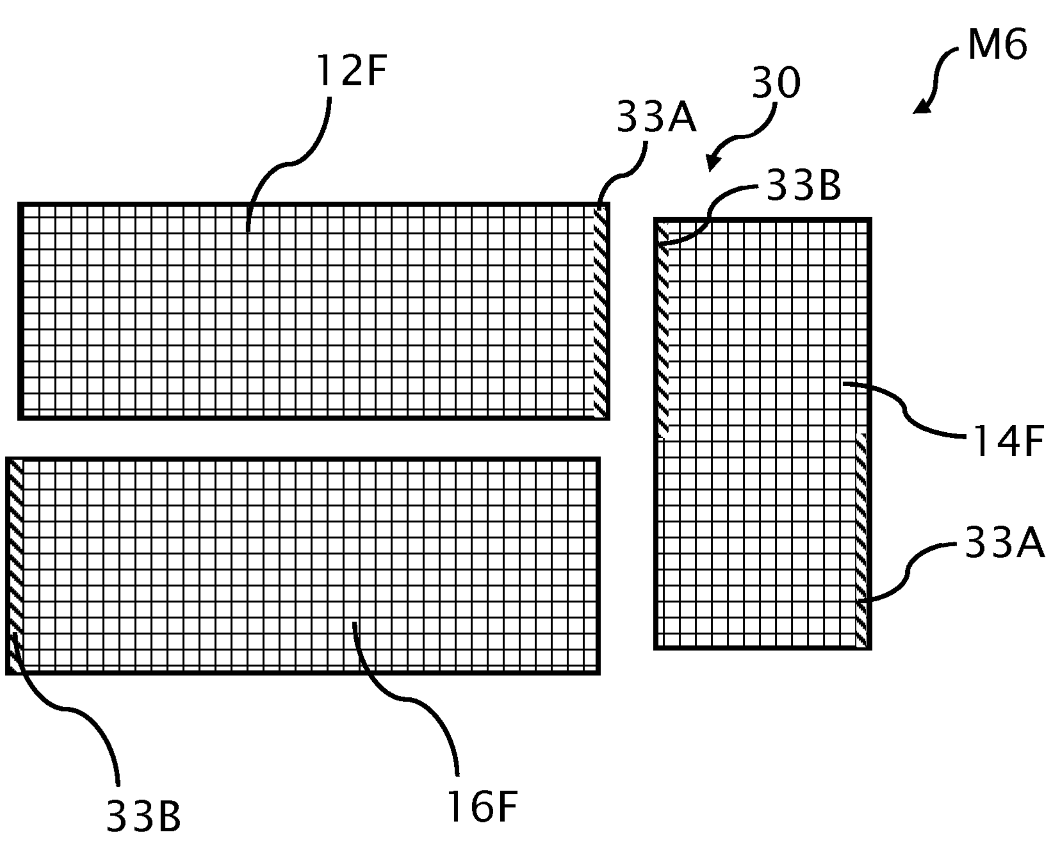
FIG. 5 illustrates a sixth step of the method according to the invention where offcuts of flooring obtained from the fifth step are removed.

The sixth step M6 of the method of the invention is illustrated in FIG. 5 and comprises removing the offcuts 35 which are superfluous areas of flooring 30 formed by the trimming incisions 34, leaving the flooring elements 12F, 14F, 16F which form partial grooves 33A, 33B, ready for the welding step M8.

Figures 6A, 6B:
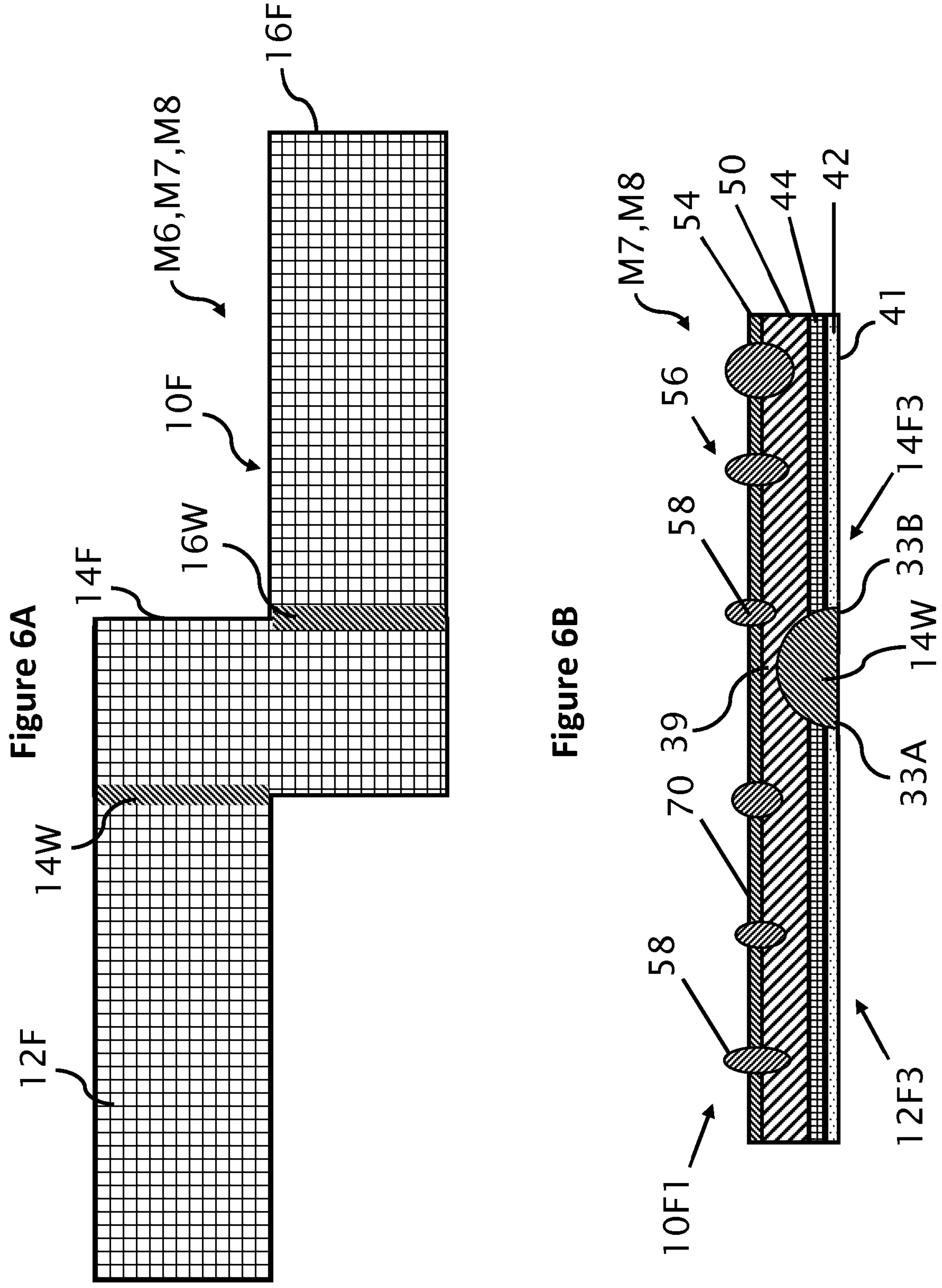
FIG. 6A illustrates a seventh and eighth step of the method according to the invention where the flooring elements are arranged according to the floor plan and the reverse side of adjacent arranged flooring elements are welded together.
FIG. 6B shows a schematic cross-section of a first embodiment of a reverse-welded surface-covering material according to the invention which has been prepared in the eighth step of the method according to the invention.

The seventh step M7 of the method of the invention is illustrated in FIGS. 6A and 6B and comprises arranging the flooring elements 12F, 14F, 16F to have the floorplan layout 10 in reverse such that the lower floor-engaging surface 41 of the flooring elements 12F, 14F, 16F is uppermost, flooring elements 12F, 14F, 16F abut each other such that partial grooves 33A, 33B formed by each adjacent pair of flooring elements 12F, 14F, 16F are aligned ready for welding step M8.

The eighth step M8 of the method of the invention is also illustrated in FIGS. 6A and 6B and comprises welding the shaped edges 36 of each adjacent pair of flooring elements 12F, 14F, 16F together along grooves 12G, 14G, 16G formed by partial grooves 33A, 33B to form lower welds 14W, 16W such that a welded floor-covering material 10F having the shape of floorplan layout 10 is formed and inverting the welded and sealed floor-covering material 10F.

The welding step M8 is carried out on a thermally reflective and insulating substrate 20 (such as Altro Whiterock™) such that gap 38 between adjacent upper layers of adjacent flooring elements 12F, 14F, 16F is sealed by the heat from the welding gun. As a result of the sealing of gap 38, adjoining pairs of flooring elements 12F, 14F, 16F are bonded together by lower symmetric welds 14W, 16W and by sealed upper layers. The lower symmetric welds 14W, 16W are formed using an automatic welding machine where a 3.5-4.5 mm weld rod is laid along the groove 12G, 14G, 16G and is heated such that the weld rod melts and the lower weld 14W, 16W is formed. Once the weld 14W, 16W has cooled, the welds 14W, 16W of welded floor-covering material 10F1, 10F2, 10F3, 10F4, 10F5 are trimmed.

Welded and sealed floor-covering material 10F1, 10F2, 10F3, 10F4, 10F5 is then rolled up, optionally on a core, for transport to the desired location for laying. In an alternative embodiment, welding step M8 may be carried out on a non-thermally-reflective and/or non-insulating substrate 20 such that there is no sealing and gap 38 remains in the welded floor-covering material 10F1, 10F2, 10F3, 10F4, 10F5.

The first embodiment of a welded floor-covering material according to the invention is indicated generally at 10F1 on FIG. 6B. Welded floor-covering material 10F1 is formed in steps M7 and M8 of the method M according to the invention as offcuts 35 have been removed, the flooring 30 has been welded and sealed, and the welded and sealed floor-covering material 10F1 formed has been inverted. Welded floor-covering material 10F1 is formed from an adjacent pair of flooring elements 12F1, 14F1. On each side of a flooring element 12F1, 14F1 which needs to be welded to a neighbouring flooring element 12F1, 14F1, a uniform partial groove 33A, 33B is formed at a lower edge of each flooring element 12F1, 14F1 where the gap 38 and a floor-engaging lower surface 41 of the flooring elements 12F1, 14F1 meet. The partial groove 33A, 33B is uniform as it has a uniform width and/or depth. The partial groove 33A, 33B has a uniform width because along the length of the partial groove 33A, 33B, the width of the partial groove 33A, 33B from gap 38 to the innermost surface of the partial groove 33A, 33B is substantially the same along the length of the partial groove 33A, 33B. The partial groove 33A, 33B has a uniform depth because along the length of the partial groove 33A, 33B, the depth of the partial groove 33A, 33B from floor-engaging lower surface 41 to the uppermost surface of the partial groove 33A, 33B is substantially the same along the length of the partial groove 33A, 33B. Each partial groove 33A, 33B has substantially the same shape such that pairs of partial grooves 33A, 33B, grooves 12G, 14G, 16G formed from them, and welds 12W are symmetrical. The uniform partial groove 33A, 33B has an approximately quarter circle shape such that the grooves 12G, 14G, 16G formed from the uniform and symmetrical partial grooves 33A, 33B have a substantially semi-circular shape. Advantages of the partial grooves 33A, 33B being uniform and symmetrical in shape along the length of the grooves 12G, 14G, 16G include that a strong bond is formed by a weld 12W, 14W, 16W in the grooves 12G, 14G, 16G.

In an alternative embodiment, the partial grooves 33A, 33B may have a triangular shape such that the grooves 12G, 14G, 16G formed from them are V-shaped grooves 12G, 14G, 16G. In an alternative embodiment, the partial grooves 33A, 33B may have a partial trapezoid shape such that the grooves 12G, 14G, 16G formed from them are trapezoid-shaped grooves 12G, 14G, 16G. In an alternative embodiment, the partial grooves 33A, 33B may have a quarter oval shape such that the grooves 12G, 14G, 16G formed from them are semi-oval-shaped grooves 12G, 14G, 16G.

Flooring elements 12F1, 14F1 are welded along the groove 12G formed by uniform and symmetrical partial grooves 33A, 33B to form welded floor-covering 10F1 having a lower weld 14W. In an alternative embodiment, the welded floor-covering material 10F1 may be formed from more than two flooring elements 12F1, 14F1, 16F1 where each adjacent pair of flooring elements 12F1, 14F1, 16F1 are welded together along grooves 12G, 14G, 16G formed by adjacent uniform and symmetrical partial grooves 33A, 33B to form two or more welds 12W, 14W, 16W. In an alternative embodiment, where a non-thermally reflective and/or non-insulating substrate 20 has been used in step M8, each adjacent pair of flooring elements 12F1, 14F1 may be separated by narrow gap 38 having a width of less than 1 mm as shown in FIG. 4B such that the upper layers of the flooring elements 12F1, 14F1 have not been sealed.

Welded and sealed floor-covering material 10F1 comprises a base layer 42 having a floor-engaging lower surface 41 wherein the base layer 42 is a synthetic material layer, a support layer 44 in the form of a scrim complex arranged on an upper surface of the base layer 42, a pigmented topcoat layer 50 on an upper surface of the support layer 44, a polyacrylate protective coating layer 54 on an upper surface of the pigmented topcoat layer 50, and a non-slip layer 56 applied to an upper surface of the protective coating layer 54. A lower weld 14W is formed in the following lower layers of welded and sealed floor-covering material 10F1: base layer 42, support layer 44, and pigmented topcoat layer 50. The remaining part of topcoat layer 50 above lower weld 14W and protective layer 54 have a sealed volume 39 where gap 38 had been. The plastics material may be a plasticised PVC plastics material. In an alternative embodiment, where a non-thermally reflective and/or non-insulating substrate 20 has been used in step M8, the adjacent pair of flooring elements 12F1, 14F1 may be separated by a narrow gap 38 having a width of less than 1 mm as shown in FIG. 4B such that the upper layers 150, 52, 54 of each adjacent pair of flooring elements 12F1, 14F1 have not been sealed and floor-covering material 10F1 is a welded floor-covering material 10F1.

Figures 7, 8:
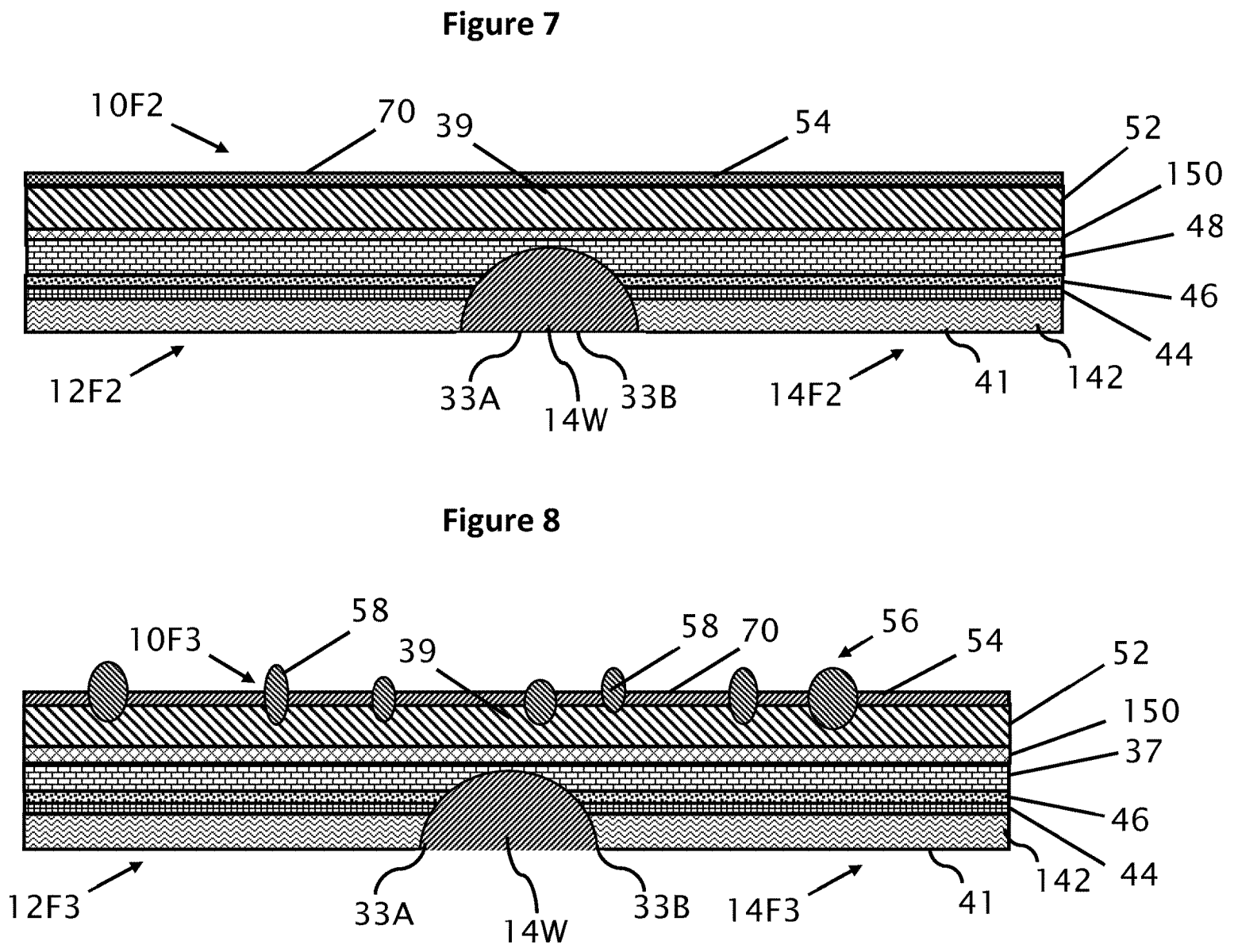

A second embodiment of a welded floor-covering material according to the invention is indicated generally at 10F2 on FIG. 7. Like features of the second embodiment to the first embodiment of the welded floor-covering material 10F1 are identified by like reference numerals. Welded and sealed floor-covering material 10F2 is formed in method steps M7 and M8 from an adjacent pair of flooring elements 12F2, 14F2. Each flooring element 12F2, 14F2 forms a partial groove 33A, 33B as for the first embodiment of the flooring elements 12F1, 14F1. Flooring elements 12F2, 14F2 are welded along the groove 14G formed by adjacent uniform and symmetrical partial grooves 33A, 33B to form welded floor-covering 10F2 having a lower weld 14W. In an alternative embodiment, the welded floor-covering material 10F2 may be formed from more than two flooring elements 12F2, 14F2, 16F2 where each adjacent pair of flooring elements 12F2, 14F2, 16F2 is welded together by grooves 12G, 14G, 16G formed by adjacent uniform and symmetrical partial grooves 33A, 33B. In an alternative embodiment, the plastics material used to form layers 142, 510, 52 may be a polyolefin material.

Welded and sealed floor-covering material 10F2 according to the second embodiment of the invention has a more complex construction than welded and sealed floor-covering material 10F1 according to the first embodiment because instead of pigmented topcoat layer 50, it includes an impregnation layer 46, a pigmented printing layer 48, a printed decorative layer 150, and a wear layer 52. The welded and sealed floor-covering material 10F2 comprises a foamed base layer 142 having a floor-engaging lower surface 41 wherein base layer 142 is a layer of foam-forming plastics material comprising a plasticised PVC composition and a blowing agent (e.g. an azodicarbonamide), a support layer 44 in the form of a non-woven glass fibre layer arranged on an upper surface of the foamed base layer 142, an impregnation layer 46 formed of plastics material arranged on an upper surface of the support layer 44, a pigmented printing layer 48 formed from a pigmented plasticised PVC composition having a contrasting (e.g. white) pigment on an upper surface of the impregnation layer 46, a printed decorative layer 150 on an upper surface of the pigmented printing layer 48, a clear wear layer 52 on an upper surface of the decorative layer 150, and a polyacrylate protective coating layer 54 on an upper surface of the clear wear layer 52. The protective coating layer 54 comprises a cured polymer layer. The plastics material may be a plasticised PVC plastics material. A lower weld 14W is formed in the following lower layers of welded and sealed floor-covering material 10F2: foamed base layer 142, support layer 44, impregnation layer 46, and pigmented printing layer 48. The remaining part of pigmented printing layer 48 above lower weld 14W and printed decorative layer 150, wear layer 52, and protective coating layer 54 have a sealed volume 39 where gap 38 had been as floor-covering material 10F2 is sealed. The partial groove 33A, 33B is formed in the base layer 142 of each flooring element 12F2, 14F2. In an alternative embodiment, the plastics material used to form layers 142, 46, 48, 150, 52 may be a polyolefin material. In an alternative embodiment, where a non-thermally reflective and/or non-insulating substrate 20 has been used in step M8, the adjacent pair of flooring elements 12F2, 14F2 may be separated by a narrow gap 38 having a width of less than 1 mm as shown in FIG. 4B such that the upper layers 150, 52, 54 of each adjacent pair of flooring elements 12F2, 14F2 have not been sealed and floor-covering material 10F2 is a welded floor-covering material 10F2.

A third embodiment of a welded floor-covering material according to the invention is indicated generally at 10F3 on FIG. 8. Like features of the second embodiment to the first and second embodiments of the welded floor-covering material 10F1, 10F2 are identified by like reference numerals. Welded floor-covering material 10F3 is formed is formed in method steps M7 and M8 from an adjacent pair of flooring elements 12F3, 14F3. Each flooring element 12F3, 14F3 forms a partial groove 33A, 33B as for flooring elements 12F1, 14F1. The adjacent pair of flooring elements 12F3, 14F3 are welded along the groove 14G formed by uniform and symmetrical partial grooves 33A, 33B to form welded floor-covering 10F3 having a lower weld 14W. In an alternative embodiment, the welded floor-covering material 10F3 may be formed from more than two flooring elements 12F3, 14F3 where each adjacent pair of flooring elements 12F3, 14F3, 16F3 is welded together along a groove 12G, 14G, 16G formed by adjacent uniform and symmetrical partial grooves 33A, 33B.

The welded and sealed floor-covering material 10F3 according to the third embodiment of the invention comprises the layers of welded and sealed floor-covering material 10F2 according to the second embodiment which are the foamed base layer 142 having a floor-engaging lower surface 41 wherein the base layer 142 is in the form of a foamed PVC layer, a support layer 44, an impregnation layer 46, a pigmented printing layer 48, a printed decorative layer 150, a wear layer 52, and a protective coating layer 54. In addition, the welded and sealed floor-covering material 10F3 comprises a non-slip layer 56 applied to an upper surface of the protective coating layer 54. Non-slip layer 56 comprises one or more particles 58 suitable for providing a non-slip surface wherein such particles 58 are at least partially embedded in the wear layer 52. The particles 58 may comprise one or more types of slip resistant particles such as degradable plastics, aluminium oxide, silicon carbide, quartz and/or glass. The plastics material may be a plasticised PVC plastics material. The partial groove 33A, 33B is formed in the base layer 142 of each flooring element 12F3, 14F3. In an alternative embodiment, the plastics material used to form layers 142, 46, 48, 150, 52 may be a polyolefin material. Flooring elements 12F3, 14F31 are welded along the groove 12G formed by partial grooves 33A, 33B to form welded floor-covering 10F3 having a lower weld 14W which is formed in the following lower layers of welded and sealed floor-covering material 10F3: foamed base layer 142, support layer 44, impregnation layer 46, and pigmented printing layer 48. The remaining part of pigmented printing layer 48 above lower weld 14W and printed decorative layer 150, wear layer 52, and protective coating layer 54 have a sealed volume 39 where gap 38 had been as floor-covering material 10F3 is sealed.

In an alternative embodiment, where a non-thermally reflective and/or non-insulating substrate 20 has been used in step M8, each adjacent pair of flooring elements 12F3, 14F3 may be separated by narrow gap 38 having a width of less than 1 mm as shown in FIG. 4B such that the upper layers 150, 52, 54 of the flooring elements 12F3, 14F3 have not been sealed and floor-covering material 10F3 is a welded floor-covering material 10F3. In an alternative embodiment, the wear layer 52 may comprise two or more wear layers 52 which comprise at least one upper wear layer 52 of a transparent synthetic material comprising one or more embedded non-slip particles and at least one lower wear layer 52 of a transparent synthetic material which contains at least part of the one or more non-slip particles. Advantages of having two or more wear layers 52 include that if the floor-covering material is embossed, the appearance of the printed decorative layer 150 is not damaged by the one or more embedded non-slip particles 56.

The printed decorative layer 150 may be applied by any known suitable printing technique such as digital printing or gravure printing on the pigmented printing layer 48. The pigmented printing layer 48 is formulated to be suitable for receiving the printed decorative layer 150. The pigmented printing layer 48 may be pigmented with a colour which is selected to contrast with the design of the printed decorative layer 150.

The protective coating layer 54 comprises a cured polymer layer and has a thickness of from 5 to 50 µm. Suitable polymers for use in the protective coating layer 54 include polyurethane, polyacrylate, urethane acrylate or a PVDF based composition. A suitable coating composition for forming protective coating layer 54 is a UV curable mixture containing from 20 to 30 parts by weight of oxybis(methyl-2,1-ethanediyl) diacrylate, from 10 to less than 20 parts by weight of 2-phenoxyethyl acrylate, from 10 to less than 20 parts by weight of acrylate resin, from 2.5 to 5 parts by weight of (1-methyl-1,2-ethanediyl)bis [oxy(methyl-2,1-ethanediyl)] diacrylate, from 1 to 5 parts by weight of benzophenone and from 1 to 5 parts by weight of 1-6, hexanedioldiacrylate was prepared. In an alternative embodiment, the protective coating layer 24 may be provided by a suitable film.

The welded floor-covering material 10F1, 10F2, 10F3 may optionally be embossed. The welded floor-covering material 10F1, 10F2, 10F3 may be provided as a roll of floor-covering material.

Figures 9, 10:
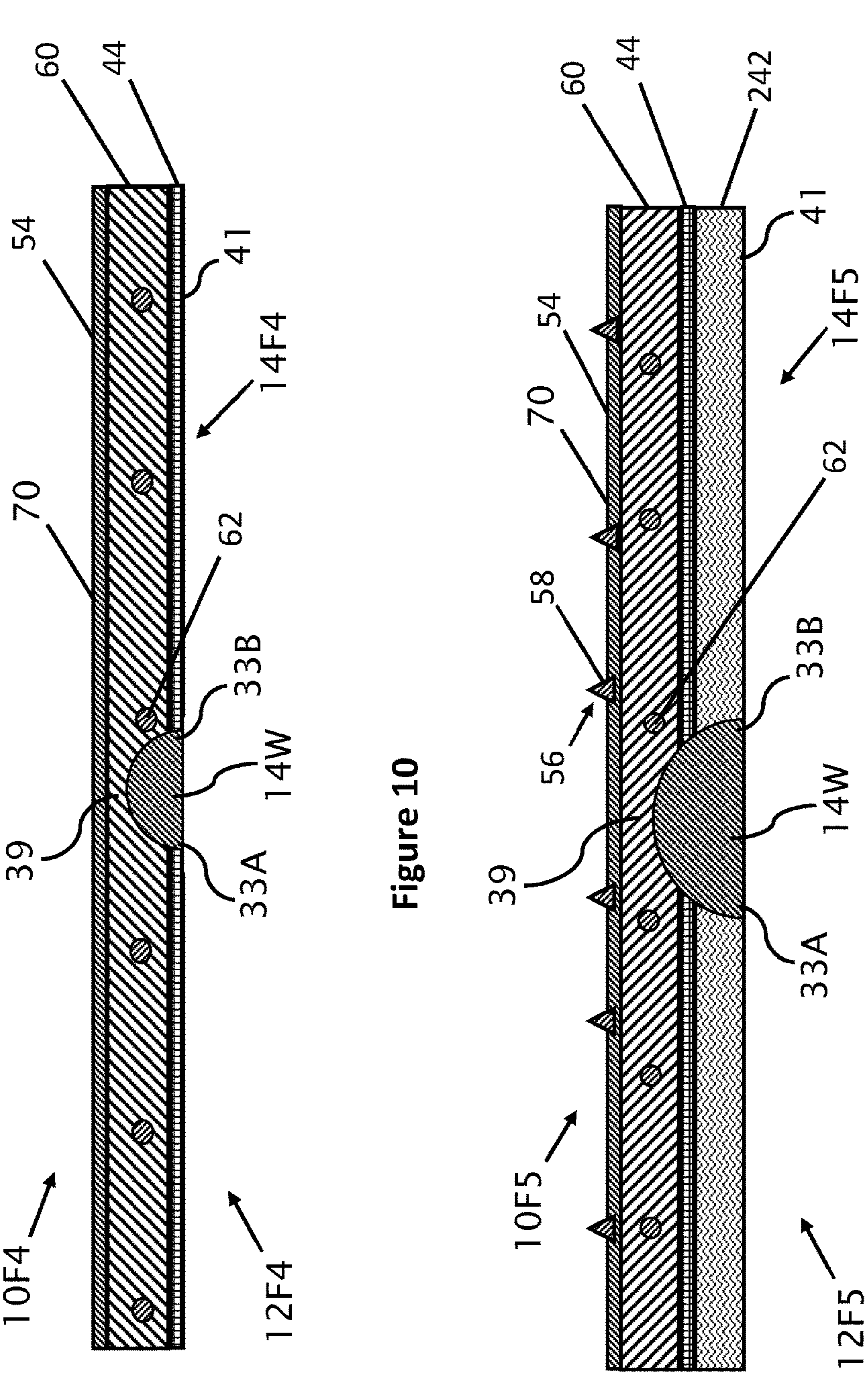
FIG. 9 shows a schematic cross-section of a fourth embodiment of a reverse-welded surface-covering material according to the invention.

A fourth embodiment of a welded and sealed floor-covering material according to the invention is indicated generally at 10F4 on FIG. 9. Like features of the fourth embodiment to the first, second, and/or third embodiments of the welded floor-covering material 10F1, 10F2, 10F3 are identified by like reference numerals. Welded floor-covering material 10F4 is formed in method steps M7 and M8 from an adjacent pair of flooring elements 12F4, 14F4. Each flooring element 12F4, 14F4 forms a partial groove 33A, 33B as for flooring elements 12F1, 14F1. Flooring elements 12F4, 14F4 are welded along the groove 32 formed by uniform and symmetrical partial grooves 33A, 33B to form welded floor-covering 10F4 having a lower weld 14W. In an alternative embodiment, the welded floor-covering material 10F4 may be formed from more than two flooring elements 12F4, 14F4, 16F4 where each adjacent pair of flooring elements 12F4, 14F4, 16F4 are welded together along grooves 12G, 14G, 16G formed by adjacent uniform and symmetrical partial grooves 33A, 33B.

Welded and sealed floor-covering material 10F4 according to the fourth embodiment of the invention comprises a lower support layer 44 having a floor-engaging lower surface 41 wherein the lower support layer 44 comprises a non-woven glass fibre layer, a structural polyolefin layer 60 comprising fibreglass fibres 62 arranged on an upper surface of the support layer 44, and a polyacrylate protective coating layer 54 on an upper surface of the structural polyolefin layer 60. The partial grooves 33A, 33B are formed in the lower support layer 44 and in the structural polyolefin layer 60 of each flooring element 12F4, 14F4. In an alternative embodiment, the fibreglass fibres 62 may be omitted from the structural layer 60. In an alternative embodiment, the structural polyolefin layer 60 may comprise a fully embedded non-slip layer of non-slip particles. In an alternative embodiment, the protective coating layer 54 may comprises a non-slip layer which comprises one or more non-slip particles suitable for providing a non-slip surface wherein such non-slip particles are at least partially embedded in the protective coating layer 54. The lower weld 14W is formed in support layer 44 and in part of structural polyolefin layer 60. The remaining part of structural layer 60 above lower weld 14W and protective coating layer 54 have a sealed volume 39 where gap 38 had been as floor-covering material 10F2 is sealed. In an alternative embodiment, each flooring element 12F4, 14F4 may comprise a foamed polyolefin layer comprising a polyolefin and an azodicarbonamide arranged on an upper surface of the lower support layer 44 and on a lower surface of the structural polyolefin layer 60.

In an alternative embodiment, where a non-thermally reflective and/or non-insulating substrate 20 has been used in step M8, each adjacent pair of flooring elements 12F4, 14F4 may be separated by a narrow gap 38 having a width of less than 1 mm as shown in FIG. 4B such that the upper layers 60 (part), 54 of the flooring elements 12F4, 14F4 have not been sealed and floor-covering material 10F3 is a welded floor-covering material 10F3. In an alternative embodiment, the structural polyolefin layer 60 may be replaced by a rubber layer.

A fifth embodiment of a welded floor-covering material according to the invention is indicated generally at 10F5 on FIG. 11. Like features of the fifth embodiment to the fourth embodiment of the welded floor-covering material 10F4 are identified by like reference numerals. Welded floor-covering material 10F5 is formed in method steps M7 and M8 from an adjacent pair of flooring elements 12F5, 14F5. Each flooring element 12F5, 14F5 forms a partial groove 33A, 33B as for flooring elements 12F4, 14F4. Flooring elements 12F5, 14F5 are welded along the groove 14G formed by uniform and symmetrical partial grooves 33A, 33B to form welded floor-covering 10F5 having a lower weld 14W. In an alternative embodiment, the welded floor-covering material 10F5 may be formed from more than two flooring elements 12F5, 14F5, 16F5 where each adjacent pair of flooring elements 12F5, 14F5, 16F5 are welded together along a groove 12G, 14G, 16G formed by adjacent uniform and symmetrical partial grooves 33A, 33B.

Welded and sealed floor-covering material 10F5 according to the fifth embodiment of the invention comprises a base layer 242 having a floor-engaging lower surface 41 wherein the base layer 242 is in the form of a foamed polyolefin plastics material comprising a polyolefin and a foaming agent (such as an azodicarbonamide), a support layer 44 in the form of a non-woven glass fibre layer arranged on an upper surface of the base layer 242, a structural polyolefin layer 60 comprising fibreglass fibres 62 arranged on an upper surface of the support layer 44, a polyacrylate protective coating layer 54 on an upper surface of the structural polyolefin layer 60, and a non-slip layer 56 incorporated in the protective coating layer 54. The lower weld 14W is formed in the following lower layers of welded and sealed floor-covering material 10F5: foamed base layer 242, support layer 44 and in part of structural polyolefin layer 60. The remaining part of structural layer 60 above lower weld 14W and protective coating layer 54 has a sealed volume 39 where gap 38 had been as floor-covering material 10F5 is sealed. In an alternative embodiment, the fibreglass fibres 62 may be omitted from the structural layer 60. In an alternative embodiment, the protective coating layer 54 may be provided by a suitable film. In an alternative embodiment, where a non-thermally-reflective and/or non-insulating substrate 20 has been used in step M8, each adjacent pair of flooring elements 12F5, 14F5 may be separated by a narrow gap 38 having a width of less than 1 mm as shown in FIG. 4B such that the upper layers 60 (part), 54 of the flooring elements 12F5, 14F5 have not been sealed and floor-covering material 10F5 is a welded floor-covering material 10F5.

In an alternative embodiment, the base layer 42, 142, 242 of welded and sealed floor-covering material 10F1, 10F2, 10F3, 10F4, 10F5 may include an additional floor-engaging base layer (not shown) which is an optionally pre-coated fabric (e.g. fleece or textile) layer, tissue layer, scrim (or support) layer, PVC layer, or a self-adhesive layer. Advantages of including a fabric layer include that a weight reduction and/or sound attenuation for the and welded sealed floor-covering material 10F1, 10F2, 10F3, 10F4, 10F5 may be obtained.

In an alternative embodiment, the support layer 44 may be formed from a plastic film, tissue, scrim, and/or textile.

The invention will now be illustrated with reference to the following Examples which are not intended to limit the scope of the claimed invention.

Example 1

In Example 1, a flooring element 12F1, 14F1 for use in the welded floor-covering 10F1 according to the first embodiment of the invention may be prepared by carrying out the following steps:

a. Coating a scrim complex with a base layer comprising a PVC plastisol;
b. Gelling the plastisol of the base layer in an oven;
C. Inverting the product;
d. Applying a pigmented topcoat layer comprising a PVC plastisol to the reverse side of the scrim complex;
e. Applying aggregate material (e.g. silicon carbide, quartz) and/or decorative elements (such as PVC chips) to the upper surface of the top layer;
f. Gelling the plastisol in an oven;
g. Applying a layer of particulate material to the pigmented topcoat layer to form a non-slip layer;
h. Embossing the surface of the topcoat layer;
i. Applying a polyacrylate protective coating layer and curing it to form a flooring element 12F1, 14F1; and
j. Winding the product into a roll of the required length.

Example 2

In Example 2, a flooring element 12F2, 14F2 for use in the welded floor-covering 10F2 according to the second embodiment of the invention may be prepared by carrying out the following steps:

a. coating a non-woven glass fibre support layer with an impregnation layer of plastics material and gelling (the coating) on a heated drum;
b. Applying a printing layer formed from a pigmented plasticised PVC composition where the pigment is white;
c. Printing onto the surface of the white printing layer to form a decorative layer having a printed design;
d. Inverting the printed layered product;
e. Applying a base layer comprising a foam-forming plastics material comprising a plasticised PVC composition and an azodicarbonamide
f. Gelling the base layer on a heated drum;
g. Inverting the product;
h. Applying a wear layer comprising a clear plastics material having a plasticised PVC composition;
i. Gelling the wear layer in an oven;
j. Embossing the wear layer;
k. Cooling, applying a polyacrylate protective coating layer, and curing it to form a flooring element 12F2, 14F2 for use in the invention.

To form a flooring element 12F3, 14F3 for use in the welded floor-covering material 10F3 according to the third embodiment of the invention, the method of the invention may additionally include after step i: a step i1 of applying a layer of particulate material to the wear layer to form a non-slip layer.

Example 3

In Example 3, a flooring element 12F4, 14F4 for use in the welded floor-covering 10F4 according to the fourth embodiment of the invention may be prepared by carrying out the following steps:

a. Preparing compositions suitable for forming a structural polyolefin layer 60 by mixing the composition in a single-screw extruder or batch mixer, pelletizing the composition formed, and then calendaring the pellets to form a structural polyolefin layer 60;
b. Placing the structural polyolefin layer 60 on a fleece fabric support layer 44 and using a double belt press to laminate the layers 44, 60 together;
c. Applying a protective layer 24 and optionally a non-slip layer 26 to an upper surface of the structural polyolefin layer 16, curing the protective layer 24, and optionally embossing the flooring element 12F4, 14F4 formed.

Example 4

In Example 4, a flooring element 12F5, 14F5 for use in the welded floor-covering 10F5 according to the fifth embodiment of the invention may be prepared by carrying out the following steps:

a. Preparing compositions suitable for forming a foamable polyolefin base layer 242 and a structural polyolefin layer 60 by mixing each composition in a single-screw extruder or batch mixer, pelletizing each composition formed, and then calendaring each pelletized composition to form a foamable polyolefin layer 242 and a structural polyolefin layer 60;
b. Placing the foamable polyolefin base layer 242 and the structural polyolefin layer 60 on a fleece fabric support layer 44 (or placing the fleece fabric layer 44 and the structural polyolefin layer 60 on the foamable polyolefin layer 242) and using a double belt press to laminate the layers 44, 242, 60 (or 242, 44, 60) together;
c. Applying a protective layer 54 and optionally a non-slip layer 56 to the transparent polyolefin layer 52, curing the protective layer 54, and optionally embossing the flooring element 12F5, 14F5 formed. Heating the flooring element 12F5, 14F5 to activate the blowing/foaming agent to form foamed polyolefin base layer 242, optionally as part of the embossing step.

The invention claimed is:

1. A welded synthetic floor-covering material, said welded synthetic floor-covering material comprising two or more flooring elements wherein each adjacent pair of flooring elements is welded together by a symmetrical lower weld wherein the symmetrical lower weld engages each flooring element of an adjacent pair of flooring elements substantially equally; and wherein the symmetrical lower weld is substantially free from a metallic element;

wherein the flooring elements comprise one or more upper layers above the symmetrical lower weld wherein the one or more upper layers comprise a decorative layer;

wherein the flooring elements have a floor engaging lower surface and wherein each flooring element of an adjacent pair of flooring elements forms a partial groove on the floor-engaging lower surface such that the symmetrical weld is formed in an adjacent pair of partial grooves wherein the adjacent pair of partial grooves is symmetrical.

2. The floor-covering material as defined in claim 1 wherein each partial groove has a uniform depth and/or uniform width.

3. The floor-covering material as defined in claim 1 wherein the one or more upper layers are separated by a gap.

4. The floor-covering material as defined in claim 3 wherein the one or more upper layers are separated by a narrow gap.

5. The floor-covering material as defined in claim 3 wherein the one or more upper layers are separated by a gap wherein the gap is aligned to the groove.

6. The floor-covering material as defined in claim 1 wherein the adjacent pair of flooring elements have one or more upper layers above the symmetrical lower weld wherein the one or more upper layers are sealed such that there is no gap between the one or more upper layers.

7. The floor-covering material as defined in claim 6 wherein the symmetrical lower weld has a depth wherein the symmetrical lower weld depth is from 40% to 80% of the depth of the floor-covering material.

8. The floor-covering material as defined in claim 1 wherein the flooring elements include one or more of the following layers: a base layer, a support layer, a structural layer, a topcoat layer, a clear wear layer, and/or an upper protective coating layer.

9. The floor-covering material as defined in claim 8 wherein the one or more base layers comprise a floor-engaging base layer.

10. The floor-covering material as defined in claim 9 wherein the floor-engaging base layer is a fabric layer, a tissue layer, support layer, a synthetic layer, or a self-adhesive layer.

11. The floor-covering material as defined in claim 10 wherein the floor-engaging base layer is a pre-coated fabric layer.

12. The floor-covering material as defined in claim 10 wherein the floor-engaging base layer is a foamed synthetic layer.

13. The floor-covering material as defined in claim 1 wherein the flooring elements are non-slip flooring elements wherein the non-slip flooring elements include a non-slip upper layer.

14. The floor-covering material as defined in claim 1 wherein the symmetrical lower weld is formed in one or more lower layers of the flooring elements.

15. The floor-covering material as defined in claim 14 wherein the one or more lower layers comprise one or more base layers, a support layer, a structural layer, and/or a topcoat layer.

16. A method of preparing a welded synthetic floor-covering material having a layout suitable for covering a pre-determined area wherein the welded synthetic floor-covering material comprises two or more flooring elements wherein the flooring elements have a floor-engaging lower surface and wherein the method comprises the following steps:

(a) providing a floor plan for the pre-determined area wherein the floor plan defines a layout of flooring elements including positions of one or more welds;

(b) providing a length of flooring and forming a groove on the floor-engaging surface of the flooring at the position of each of the one or more welds;

(c) cutting the length of flooring to form the one or more adjacent pairs of flooring elements; and (d) arranging the flooring elements according to the layout and welding together each of the one or more adjacent pairs of flooring elements to form a symmetrical lower weld wherein the symmetrical lower weld engages each flooring element substantially equally.

17. The method as defined in claim 16 wherein step (a) additionally comprises preparing a flooring cutting plan for cutting up a length of flooring to obtain the flooring elements to minimize waste.

18. The method as defined in claim 16 wherein the steps are carried out sequentially such that cutting step (c) is performed after groove forming step (b).

19. The method as defined in claim 16 wherein step (d) comprises sealing one or more upper layers of each adjacent pair of flooring elements.

20. The method as defined in claim 19 wherein step (d) is performed on an insulating and/or reflective substrate.

21. The method as defined in claim 16 wherein step (c) comprises trimming the length of flooring to remove one or more superfluous areas of flooring.

* * * * *